United States Patent

Smith, Jr.

[11] Patent Number: 4,494,852
[45] Date of Patent: Jan. 22, 1985

[54] PHOTOFLASH DETECTOR

[76] Inventor: Roland Smith, Jr., P.O. Box 6789, Hollywood, Fla. 33021

[21] Appl. No.: 497,880

[22] Filed: May 25, 1983

[51] Int. Cl.³ .................. G03B 17/18; G03B 17/56
[52] U.S. Cl. .................. 354/467; 354/127.1; 340/600; 315/134
[58] Field of Search ........... 354/127.1, 127.11, 127.12, 354/424, 467; 340/600, 309.15, 322, 384 R, 815.3, 384 E; 315/134, 136, 151, 241 P, 135

[56] References Cited

U.S. PATENT DOCUMENTS

| | | | |
|---|---|---|---|
| 3,707,903 | 1/1973 | Weber | 95/11.5 R |
| 3,714,407 | 1/1973 | Bowers, Jr. | 240/1.3 |
| 3,778,672 | 12/1973 | Fountain | 315/135 |
| 3,914,647 | 10/1975 | Broekstra et al. | 315/151 X |
| 4,100,459 | 7/1978 | Nakamura et al. | 315/134 X |
| 4,125,766 | 11/1978 | Holtje | 250/214 |
| 4,155,029 | 5/1979 | Yamaoka | 315/151 |
| 4,249,160 | 2/1981 | Chilvers | 315/134 X |
| 4,367,933 | 1/1983 | Sahara | 354/23 D |

Primary Examiner—William B. Perkey
Attorney, Agent, or Firm—Oltman and Flynn

[57] ABSTRACT

A self-contained photodetector for detecting the light flash from a photoflash unit which is supposed to flash when the shutter of a camera opens. The detector has a light-activated SCR for turning on an IC chip timer, which produces an output signal that turns on a transistor and causes a piezoelectric buzzer to produce an audible signal. All these components are powered by a battery which is contained in the same housing with them. This housing has an opening for passing light onto the SCR.

5 Claims, 2 Drawing Figures

PHOTOFLASH DETECTOR

SUMMARY OF THE INVENTION

This invention relates to a photoflash detector for use with a camera to determine whether the camera's photoflash unit operated when the camera shutter opened to take a photograph.

One of the problems with indoor photography using a single-lens reflex camera is that the photographer's view is blocked momentarily when the picture is taken. The photographer views the object through a pivoted mirror and the lens through which the film will be exposed. At the instant the shutter opens, this mirror flips out of the way of the lens and blocks the photographer's view of the subject. Therefore, the photographer cannot see whether the flash bulb went off unless he or she happens to see it out of the corner of his or her eye. A professional photographer is likely to be concentrating on the subject so intently that he or she would not see the flash and can only assume that it did occur. However, if the flash did not occur, the photograph is very likely to be spoiled. The present invention overcomes this problem.

In accordance with the presently-preferred embodiment of this invention, a self-contained photoflash detector is provided whose operation depends only on whether or not a photoflash occurs. This detector has a light-activated SCR, a timer, and a transistor which turns on an audible buzzer in response to a photoflash which activates the SCR, all powered by a small battery and all contained in a small housing which may be held by the photographer or an assistant or may be attached to the camera.

A principal object of this invention is to provide a novel photoflash detector for use with a camera.

Another object of this invention is to provide such a photoflash detector which is a small, self-contained unit which operates independent of the camera except that it responds to a light flash produced by a photoflash unit on the camera.

Further objects and advantages of this invention will be apparent from the following detailed description of a presently-preferred embodiment which is illustrated schematically in the accompanying drawing.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
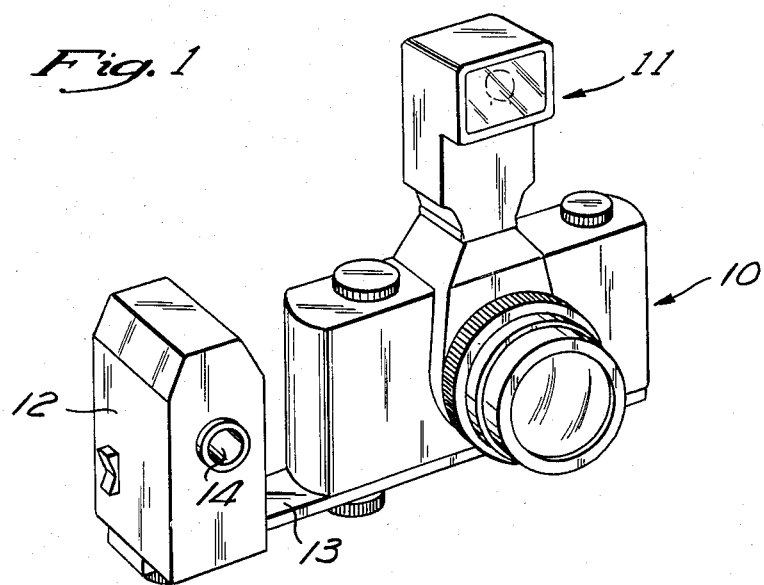
FIG. 1 is a front elevational view of a single-lens reflex camera with a photoflash unit and the present photoflash detector positioned to detect a light flash from the photoflash unit.

Referring to FIG. 1, a single-lens reflex camera 10 of known design is shown with a photoflash unit 11 of known design which produces a flash of light when the camera shutter opens to take a photograph indoors. If the light flash does not occur, the photograph very likely is spoiled.

In accordance with the present invention, a novel photoflash detector is provided which responds to the flash of light produced by the photoflash unit 11 to produce a recognizable signal to the photographer, preferably an audible signal, telling him or her that the flash did occur.

As shown in FIG. 1, the photoflash detector may be physically coupled to the camera so that they can be handled as a unit but it is not operationally coupled to the camera shutter or to the photoflash unit 11 except for sensing a light flash produced by the latter. In FIG. 1 the photoflash detector is in a small housing 12 mounted on a bar 13 attached to the bottom of the camera and extending laterally from the camera. The housing has an opening 14 in front which passes light onto a photo-switch inside, preferably a light-activated silicon controlled rectifier, as explained with reference to FIG. 2.

If desired, however, the photoflash detector can be physically disconnected from the camera.

Figure 2:
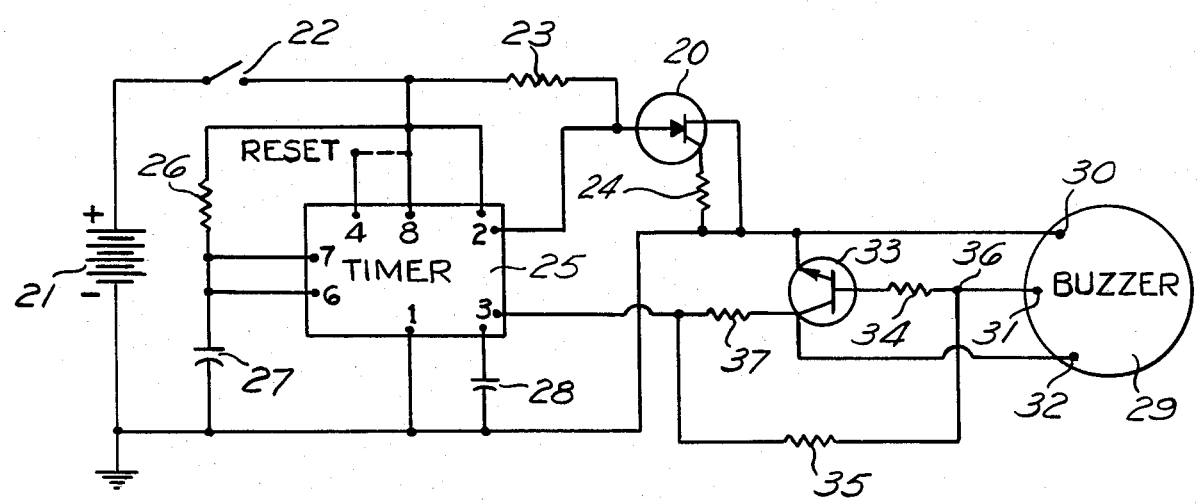
FIG. 2 is a schematic electrical circuit diagram of the present photoflash detector.

Referring to FIG. 2, the light-sensitive switch in the photoflash detector is a light-activated SCR 20 which has its anode connected to the positive terminal of a battery 21 through a manually operated on/off switch 22 and a resistor 23. The cathode of the light-activated SCR is connected directly to the grounded negative terminal of battery 21. The control electrode of the SCR is exposed to light entering the photoflash detector housing 12 (FIG. 1) at the opening 14. A bias resistor 24 is connected between the cathode and the control electrode. Under normal illumination and in the absence of a light flash from the photoflash unit 11 the light-activated SCR will be off.

The photoflash detector circuit includes a timer having "555" integrated circuit chip 25, which is a well known electronic component, whose operation as a one-shot is described in "Signetics Digital Linear MOS Applications" (1974), page 6–78, with reference to FIG. 1a. The 2 terminal of this IC chip is connected directly to the anode of the light-activated SCR 20 so that when SCR 20 turns on, the negative-going pulse at the anode of SCR 20 starts the timer, which remains on for a time interval determined by a resistance-capacitance circuit having a resistor 26 connected between 8 (power supply) terminal and the 7 and 6 terminals of IC chip 25 and a capacitor 27 connected between the same 7 and 6 terminals and the grounded 1 terminal IC chip 25. The timer also has a bypass capacitor 28 connected between its 5 terminal and its grounded 1 terminal.

When the light-activated SCR 20 detects a photoflash the IC chip 25 produces a positive pulse on its 3 (output) terminal which remains until the time interval of the timer (determined by R-C 26,27) ends.

The photoflash detector includes a buzzer 29 containing a piezoelectric device for operating the buzzer to produce an audible sound, indicating that the timer has been turned on. The buzzer has a grounded terminal 30 and two additional terminals 31 and 32.

The buzzer 29 is turned on by an NPN transistor 33 having a ground emitter, a collector connected directly to buzzer terminal 32, and a base connected through a resistor 34 to buzzer terminal 31. A resistor 35 is connected between the 3 terminal of IC chip 25 and buzzer terminal 31. Resistors 34 and 35 form a voltage divider with its opposite terminals connected to terminal 3 of the IC chip and the base of transistor 33 and its intermediate terminal 36 connected to buzzer terminal 31. A resistor 37 is connected between terminal 3 of IC chip 25 and the collector of transistor 33. In the absence of a positive signal on terminal 3 of IC chip 25, transistor 33 will be off and the buzzer 29 will be silent.

When a photoflash occurs, the resultant light will turn on the light-activated SCR 20, causing the timer interval to start and causing a positive signal to appear at terminal 3 of IC chip 25. This positive signal is applied through resistors 35 and 34 to the base of NPN transistor 33, which now begins to conduct since its emitter is grounded. The emitter-collector current in transistor 33 causes buzzer terminal 32 to assume virtually a ground potential. At the same time, the positive voltage at intermediate point 36 of the voltage divider 35,34 is applied to buzzer terminal 31. This voltage is sufficient to turn on the buzzer 29, which produces an audible alarm telling the photographer that the photoflash did occur.

In one practical embodiment the time interval of timer 25 is about one second, at the end of which it is automatically reset by a positive signal applied to its 4 terminal from its 8 terminal. This turns off the SCR 20, the transistor 33 and the buzzer 29 until the next light flash is received by the SCR.

If a photoflash does not occur (which would likely result in a defective photograph) the buzzer 29 will not sound and this will notify the photographer of the failure of the photoflash unit.

I claim:

1. A photoflash detector for use with a camera having a photoflash unit for producing a flash of light when the camera shutter opens, said detector comprising:

a light-activated SCR electrically disconnected from said photoflash unit and operatively arranged to be activated in response to a flash of light from the photoflash unit;

a signalling device which produces an audible signal;

circuit means operatively coupling said light-activated SCR to said signalling device to operate the latter in response to the activation of said SCR;

a battery operatively connected to power said light-activated SCR, said signalling device and said circuit means;

and a housing containing said battery, light-activated SCR, signalling device and circuit means to provide a self-contained unit.

2. A photoflash detector according to claim 1, wherein said housing is light-transparent adjacent said light-activated SCR for passing light onto the latter.

3. A photoflash detector according to claim 1, wherein said circuit sense means comprises:

a timer operatively connected to said light-activated SCR to be turned on when said SCR is activated;

and a transistor operatively connected to said timer and said signalling device to turn on said signalling device in response to the turning on of the timer.

4. A photoflash detector according to claim 3, and further comprising:

a manual switch connected between said battery and said light-activated SCR to turn the latter off after said signalling device is turned on.

5. A photoflash detector according to claim 4 wherein said housing has an opening for passing light onto said light-activated SCR.

* * * * *